(12) United States Patent
Oh et al.

(10) Patent No.: US 6,813,417 B2
(45) Date of Patent: Nov. 2, 2004

(54) TAPERED WAVEGUIDE INTERCONNECTION STRUCTURE AND METHOD OF FABRICATING THE SAME

(75) Inventors: Min-Cheol Oh, Glendale, CA (US); Harold R. Fetterman, Santa Monica, CA (US); William Steier, San Marino, CA (US); Joseph Michael, Los Angeles, CA (US)

(73) Assignee: Pacific Wave Industries, Inc., Los Angeles, CA (US)

( * ) Notice: Subject to any disclaimer, the term of this patent is extended or adjusted under 35 U.S.C. 154(b) by 0 days.

(21) Appl. No.: 10/081,976

(22) Filed: Feb. 20, 2002

(65) Prior Publication Data

US 2003/0156794 A1 Aug. 21, 2003

(51) Int. Cl.[7] ................................................. G02B 6/26
(52) U.S. Cl. .......................... 385/43; 385/50; 385/141
(58) Field of Search ........................ 385/27, 31, 39–43, 385/50, 129–132, 141–145

(56) References Cited

U.S. PATENT DOCUMENTS

| | | | | |
|---|---|---|---|---|
| 6,067,387 A | * | 5/2000 | Oh et al. ........................ | 385/2 |
| 6,310,995 B1 | * | 10/2001 | Saini et al. ..................... | 385/28 |
| 6,587,609 B2 | * | 7/2003 | Lee et al. ....................... | 385/16 |
| 2003/0059189 A1 | * | 3/2003 | Ridgway et al. ............. | 385/129 |

OTHER PUBLICATIONS

R. A. Soref et al., "Large Single–Mode Rib Waveguides in GeSi–Si and Si–on–SiO2," *IEEE J. Quantum Electron.*, vol. 27, No. 8, pp. 1971–1974, Aug. 1991.
T. Watanabe et al., "Novel 'serially grafted' connection between functional and passive polymer waveguides," *Appl. Phys. Lett.*, 65 (10), pp. 1205–1207, Sep. 5, 1994.
M.–C. Oh et al., "Electrooptic Polymer Modulators Operating in Both TE and TM Modes Incorporating a Vertically Tapered Cladding," *IEEE Photon. Technol. Lett.*, vol. 9, No. 9, pp. 1232–1234, Sep. 1997.
R. S. Fan et al., "Tapered Polymer Single–Mode Waveguides for Mode Transformation," *J. Lightwave Technol.*, vol. 17, No. 3, pp. 466–474, Mar. 1999.
S. S. Saini et al., "Passive active resonant coupler platform with tapered passive waveguide," *Electron. Lett.*, vol. 36, No. 13, pp. 1153–1155, Jun. 22, 2000.
N. Keil et al., "Hybrid polymer/silica vertical coupler switch with <–32dB polarization–independent crosstalk," *Electron. Lett.*, vol. 37, No. 2, pp. 89–90, Jan. 18, 2001.

* cited by examiner

Primary Examiner—John D. Lee
(74) Attorney, Agent, or Firm—Henricks, Slavin & Holmes LLP

(57) ABSTRACT

A tapered electrooptic (EO) polymer waveguide interconnection structure coupling an EO polymer waveguide and a passive polymer waveguide and a method of fabricating the same.

24 Claims, 3 Drawing Sheets

TAPERED WAVEGUIDE INTERCONNECTION STRUCTURE AND METHOD OF FABRICATING THE SAME

BACKGROUND OF THE INVENTION

A successful integration of waveguide devices made of different materials could potentially provide a hybrid device capable of utilizing the respective advantages of the different materials. To this end, it would be desirable to be able to provide an adiabatic or low-loss interconnection between an electrooptic (EO) polymer waveguide and a passive polymer waveguide.

BRIEF DESCRIPTION OF THE DRAWINGS

A detailed description of embodiments of the invention will be made with reference to the accompanying drawings.

DETAILED DESCRIPTION

The following is a detailed description of the best presently known mode of carrying out the invention. This description is not to be taken in a limiting sense, but is made merely for the purpose of illustrating the general principles of the invention.

Figure 1:
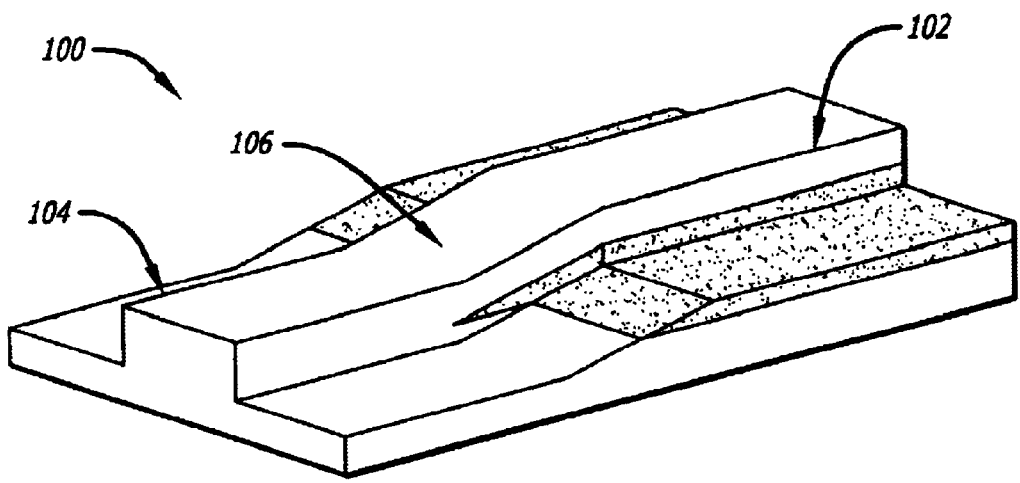
FIG. 1 illustrates an exemplary embodiment of a vertical taper structure interconnecting an EO polymer waveguide and a passive polymer waveguide.

Referring to FIG. 1, an exemplary waveguide structure 100 according to the present invention includes: an electrooptic (EO) polymer waveguide 102, a passive polymer waveguide 104, and a tapered EO polymer waveguide interconnection structure 106 between the EO polymer waveguide 102 and the passive polymer waveguide 104. An exemplary passive polymer waveguide 104 consisting of core and claddings is connected to the EO polymer waveguide 102 where the EO polymer layer is tapered and sandwiched between the passive polymer cladding layers. For clarity, cladding layers are not shown in this figure.

An one embodiment, the EO polymer waveguide 102 and the passive polymer waveguide 104 provide single mode propagation, and the interconnection structure 106 provides a coupling between the two waveguides without higher order mode coupling. In such an embodiment, the dimensions of each waveguide are selected to provide single mode propagation and both the EO and passive waveguides have a rib structure which produces a single mode waveguide regardless of the refractive index difference of the cladding and core polymer. Based on an over-sized rib waveguide design, a rib waveguide structure supporting a single mode can be provided. See, R. A. Soref, J. Schmidtchen, and K. Petermann, "Large single-mode rib waveguides in GeSi-Si and Si-on-SiO2," IEEE J. Quantum Electron., vol. 27, pp. 1971–1974, 1991, incorporated herein by reference.

To achieve successful (low loss or adiabatic) coupling between the two waveguides without higher order mode coupling, the tapered waveguide 106 should vary slowly with a small angle. Although the taper angle is preferably no greater than 0.4°, it can be greater, for example, if more interconnection loss is acceptable. An adiabatic interconnection through a tapered waveguide advantageously couples the light between the waveguides no matter how great the difference in the respective refractive indices of the waveguides.

Figure 2:
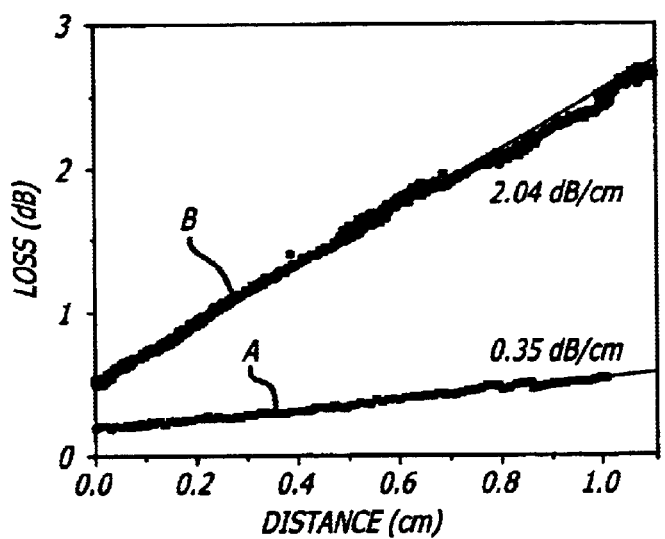
FIG. 2 is a plot illustrating propagation losses of exemplary planar waveguides made of EO and passive polymer material measured with a liquid out-coupling technique.

With regard to materials, an exemplary passive polymer waveguide 104 is formed with a UV-curable fluorinated acrylate. This polymer contains a substantial amount of fluorine compound so that the intrinsic absorption loss due to the C-H vibration overtone should be low. A liquid immersion technique, where the guided mode of a planar waveguide made of a polymer film is coupling out of the waveguide when the film is immersed into a high index liquid, was employed to investigate the loss of the polymer material. The sample was slowly moved into the liquid, then out-coupled light power was detected as shown in FIG. 2. From the slope of the measured power change as a function of the distance, the loss of the passive polymer film was found to be 0.35 dB/cm (plot "A" in FIG. 2). However, the loss could increase to 0.5 dB/cm depending on the UV-curing condition. It has been observed that the photoinitiator incorporated in the material is very sensitive to oxygen. In a preferred embodiment, during the UV curing, an oxygen free environment is used to reduce a scattering source due to the inhomogeneous curing. The refractive index of the fluorinated polymer is adjustable between 1.41 and 1.50. For cladding and core layers of the passive waveguide, the polymers with a refractive index of 1.445 and 1.460 were used, respectively.

An exemplary EO polymer waveguide 102 comprises a chromophore, for example, a highly nonlinear chromophore with a tricyanobutadiene acceptor and a phenyltetraene bridge. A sample of this material was poled at 200° C. and r33 of 35 pm/V was obtained for 1550 nm. The EO polymer had an EO coefficient of 35 pm/V and a glass transition temperature of 200° C. which provides good thermal stability. Referring again to FIG. 2, material loss of the EO polymer was observed to be ~2.0 dB/cm (plot "B" in FIG. 2) which was measured by the liquid out-coupling method. The refractive index of the EO polymer was 1.64 at 1550 nm.

Figure 3:
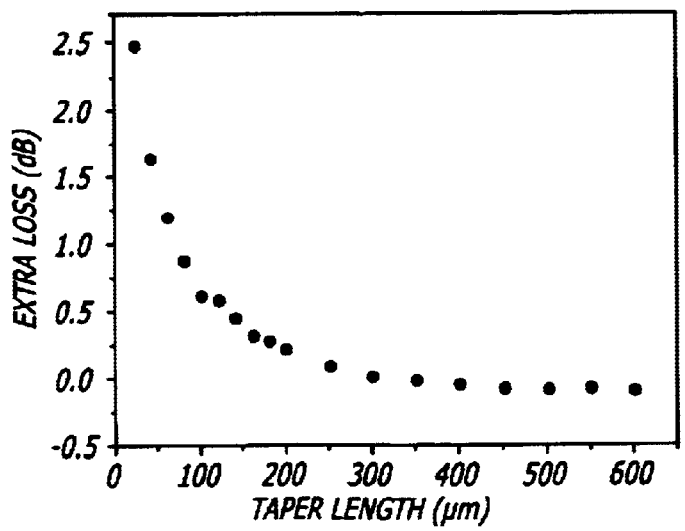
FIG. 3 is a plot of a waveguide structure simulation with a dimensional beam propagation method showing power transfer efficiency as a function of taper length.

A 3-dimensional Beam Propagation Methods (BPM) simulation of mode coupling was performed to optimize coupling efficiency for the given refractive index of the material. It was observed that most of the input light launched at the passive waveguide with a core thickness of 6 mm was coupling to the EO waveguide with a 1.2 mm thick core. The extra loss caused by the taper was calculated from the field overlap in the EO waveguide after the propagation. In this calculation, the taper was assumed to have linear variation of the thickness. As shown in FIG. 3, the transition loss becomes negligible if the taper length is longer than 300 μm (which, in this example, corresponds to a taper angle of 0.2°).

According to the present invention, a method of operably interconnecting an electrooptic (EO) polymer waveguide and a passive polymer waveguide comprises providing a tapered electrooptic (EO) polymer waveguide interconnection structure between an EO polymer waveguide and a passive polymer waveguide. With reference to FIGS. 4A–4E, an exemplary waveguide structure fabrication is described below.

Figure 4A:
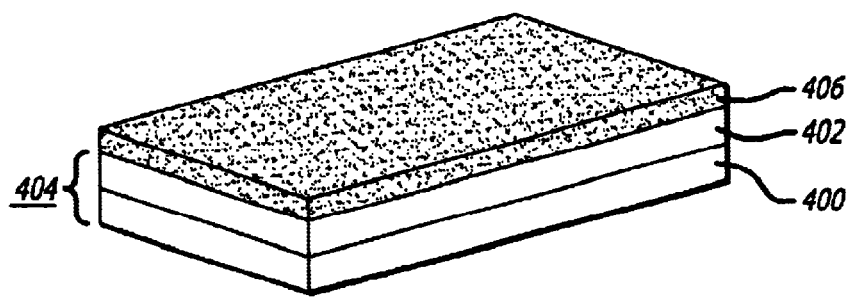
FIGS. 4A–4E illustrate steps of a method of fabricating a waveguide structure according to the present invention.
Figure 4B:
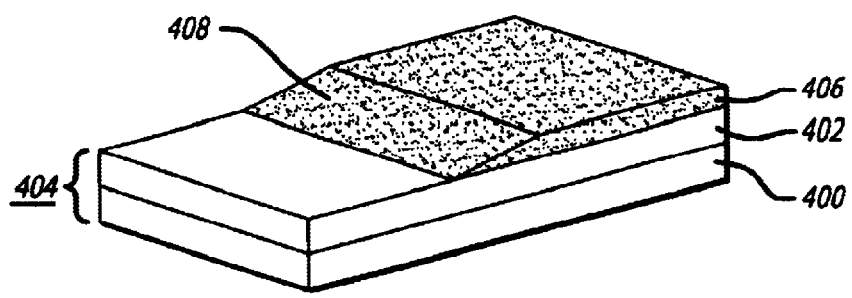

Referring to FIG. 4A, as a first step, the fluorinated polymer material with a refractive index of 1.445 was coated on a Si wafer as a lower cladding 400 of the passive waveguide. Then another passive polymer 402 with an index of 1.460 was coated to have 3-mm thickness. This layer 404 serves as a half of the core layer of the passive waveguide. These fluorinated polymers were cured by an intensive UV in a nitrogen environment. The EO polymer 406 was coated on the passive polymer layers to have a thickness of 1.5 mm, and then, as shown in FIG. 4B, it was etched by oxygen plasma with a shadow mask to produce a taper 408. In this etching process with a fixed RF power and gas pressure, the gap between the sample and the shadow mask determines the profile of the taper 408. A wider gap will produce a longer taper length due to the deeper penetration of the reactive ions into the shadowed area. See, M. C. Oh, W.Y. Hwang, H.M. Lee, S.G. Han, and Y.H. Won, "Electro-optic polymer waveguides with vertically tapered cladding for polarization-independent devices," IEEE Photon. Technol. Lett., vol. 9, 1997, incorporated herein by reference.

Figure 4C:
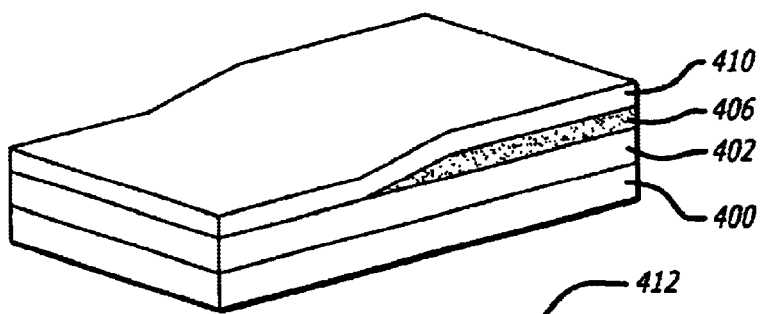
Figure 4D:
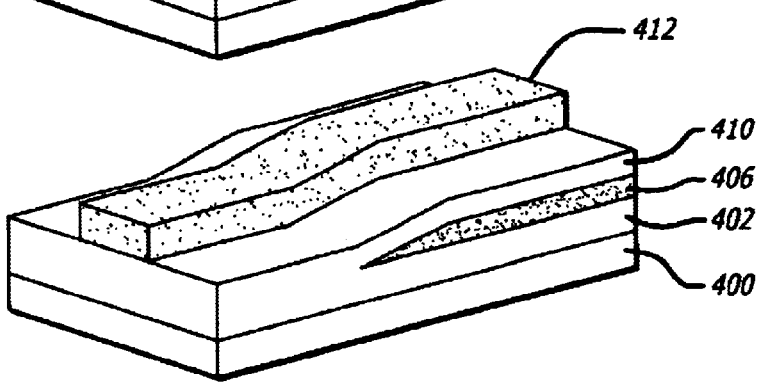
Figure 4E:
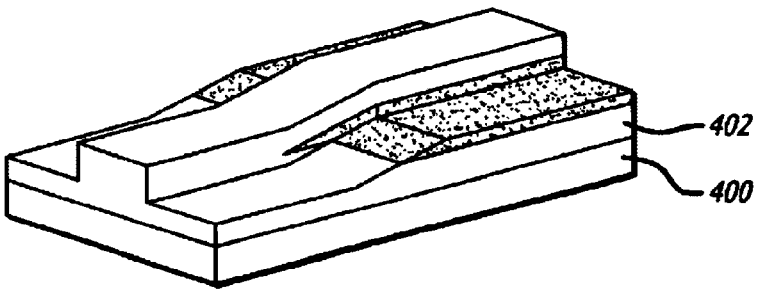

Referring to FIG. 4C, on top of the tapered EO polymer layer, the other half of the passive core layer is coated to have 3-mm thickness as layer 410. As a result, the EO polymer layer is sandwiched between the passive core polymer layers that have the total thickness of 6 mm. In order to define a rib waveguide structure, and referring to FIG. 4D, straight waveguide patterns are printed by a photolithography. A resist pattern 412 serves as a mask during an oxygen reactive ion etching (RIE) with a typical etch rate of 0.1 mm/min. Through an optimization of the RIE condition, and referring to FIG. 4E, a passive waveguide with a rib height of ~3.5 mm was produced, and the height of the EO polymer waveguide becomes 0.5 mm which is enough to confine the guided mode in the high index EO waveguide. Finally, an upper cladding (not shown) of the passive waveguide is coated to complete the rib waveguide structure. The electrode structure for the EO polymer device was not included in this example fabrication.

Thus, an exemplary method of fabricating a waveguide structure according to the present invention includes: coating a passive polymer lower cladding 400 over a substrate; coating a passive core layer lower portion 402 over the passive polymer lower cladding 400; curing the passive polymer lower cladding 400 and the passive core layer lower portion 402; coating an electrooptic (EO) polymer layer 406 over the passive core layer lower portion 402; etching the EO polymer layer 406 to produce a tapered EO polymer layer with a tapered region 408; coating an passive core layer upper portion 410 over the tapered EO polymer layer; etching the tapered EO polymer layer to produce a rib waveguide structure; and coating a passive polymer upper cladding over the rib waveguide structure. In one embodiment, the passive polymer lower cladding 400 and the passive core layer lower portion 402 are cured with ultraviolet CUV) light. In another embodiment, the passive polymer lower cladding 400 and the passive core layer lower portion 402 are cured in a nitrogen environment. In another embodiment, the EO polymer layer 406 is etched by oxygen plasma with a shadow mask to produce the tapered region 408. In another embodiment, a fixed radio frequency (RF) power and gas pressure are employed for etching the EO polymer layer 406. In another embodiment, a width of a gap between the EO polymer layer 406 and the shadow mask is selected to control a taper length of the tapered region 408. In another embodiment, the tapered EO polymer layer is etched by: printing waveguide patterns 412 over the tapered EO polymer layer, and employing an oxygen reactive ion etching process to produce the rib waveguide structure.

Figure 5:
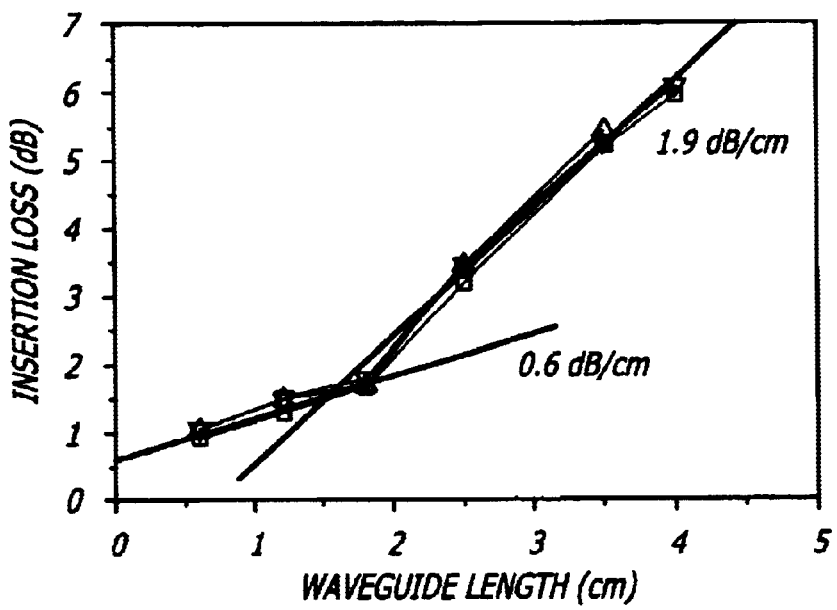
FIG. 5 is a plot of cutback loss measurements of a tapered interconnection structure, showing the interconnection loss as low as 0.2 dB, and the EO and passive waveguide having losses of 0.6 and 1.9 dB/cm, respectively.
Figure 6A:
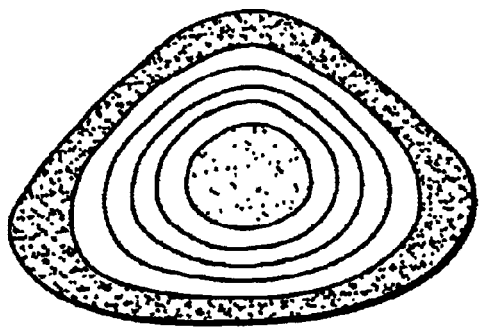
FIG. 6 shows guided mode profiles measured (a) from the passive waveguide, (b) and (c) from the tapered transient section, and (d) from the EO waveguide.
Figure 6B:
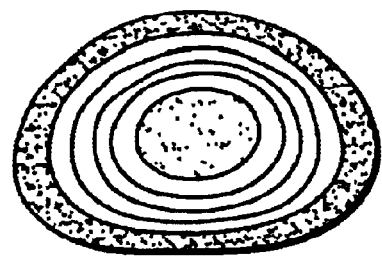
Figure 6C:
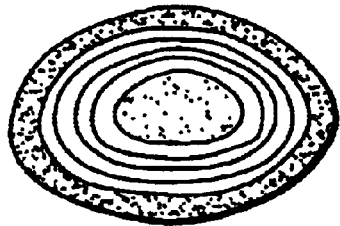
Figure 6D:

Further with regard to the exemplary fabricated waveguide structure, a cutback measurement was performed to characterize the interconnection loss from the fabricated device where the insertion loss of the waveguide was measured for different lengths of the device. The measurement was taken from a 4-cm long waveguide where a ~250-mm long taper section was located in the middle of the waveguide. A 1550 nm TM-polarized light was coupled into the passive waveguide section through an ordinary single mode optical fiber, and then the output light was collected by a 60×objective lens. During the cutback measurement, the sample was cut out from the EO waveguide side. FIG. 5 shows the result obtained from 4 waveguides fabricated on a wafer. These points are well fitted with two straight lines on each section. The propagation losses of the EO and passive polymer waveguides were observed to be 1.9 and 0.6 dB/cm, respectively. The loss of the EO waveguide is quite close to that of the planar waveguide measurement, while the passive waveguide shows a rather higher loss, which may be caused by the surface roughness induced during the taper etching. From this measurement, the total coupling loss dominated by the fiber input coupling was also obtained as 0.6 dB. Taking into account the loss of the 2-cm passive waveguide as 1.2 dB and that of the 2-cm EO waveguide as 3.8 dB, the extra loss introduced by the tapered transition loss becomes 0.4 dB to match the total loss of 6 dB measured from the 4-cm long waveguide. By the cutback measurement of the fabricated device, an interconnection loss less than 0.4 dB was demonstrated.

The reduction of coupling loss is of interest to reduce the loss of fiber pigtailed EO polymer devices where the coupling loss can be as high as 7 dB due to the significant mode mismatch with a normal fiber. The structure of the present invention can reduce the coupling loss to less than 2 dB for the two facets. Referring to FIG. 6, the mode profiles of the waveguide were observed from several different positions of the tapered waveguide: (a) from the passive waveguide, (b) and (c) from the tapered transient section, and (d) from the EO waveguide, in which the mode size is 9.5 $\mu$m×6.6 $\mu$m, 7.9 $\mu$m×5.8 $\mu$m, 7.4 $\mu$m×5.2 $\mu$m, and 7.9 $\mu$m×2.7 $\mu$m, respectively. As shown in FIG. 6, the passive waveguide has a larger mode profile than the EO polymer waveguide. The mode profile of the tapered section shows how the modes are evolved The vertical mode size was gradually changed from 6.6 mm to 2.7 mm while the lateral mode size was not significantly changed. By the mode size comparison to single mode fiber, the mode mismatch loss was calculated, which was as low as 0.5 dB for the passive waveguide while 3.5 dB for the EO waveguide.

Although the present invention has been described in terms of the preferred embodiment above, numerous modifications and/or additions to the above-described preferred embodiment would be readily apparent to one skilled in the art. It is intended that the scope of the present invention extends to all such modifications and/or additions.

We claim:

1. A method of operably interconnecting an electrooptic (EO) polymer waveguide and a passive polymer waveguide, comprising:

providing a tapered electrooptic (EO) polymer waveguide interconnection structure between an EO polymer waveguide and a passive polymer waveguide, the EO polymer waveguide including a nonlinear chromophore with a tricyanobutadiene acceptor and a phenyltetraene bridge.

2. A waveguide structure, comprising:

an electrooptic (EO) polymer waveguide including a nonlinear chromophore with a tricyanobutadiene acceptor and a phenyltetraene bridge;

a passive polymer waveguide; and a tapered EO polymer waveguide interconnection structure between the EO polymer waveguide and the passive polymer waveguide.

3. The waveguide structure of claim 2, wherein the EO polymer waveguide and the passive polymer waveguide provide single mode propagation, and the interconnection structure provides a coupling between the two waveguides without higher order mode coupling.

4. The waveguide structure of claim 2, wherein an interconnection loss associated with the interconnection structure is less than 0.4 dB.

5. The waveguide structure of claim 2, wherein the interconnection structure is vertically tapered.

6. The waveguide structure of claim 2, wherein a taper length of the interconnection structure is 300 μm or more.

7. The waveguide structure of claim 2, wherein a taper angle of the interconnection structure is no greater than 0.4 degrees.

8. The waveguide structure of claim 2, wherein the EO polymer waveguide and the passive polymer waveguide are formed as rib structure.

9. The waveguide structure of claim 2, wherein the EO polymer waveguide has a higher reflective index that the passive polymer waveguide.

10. The waveguide structure of claim 2, wherein the passive polymer waveguide has a larger mode profile than the EO polymer waveguide.

11. The waveguide structure of claim 2, wherein the passive polymer waveguide comprises a fluorinated polymer.

12. The waveguide structure of claim 2, wherein the passive polymer waveguide comprises a fluorinated acrylate.

13. A method of operably interconnecting an electroptic (EO) polymer waveguide and a passive polymer waveguide, comprising:

providing a tapered electrooptic (EO) polymer waveguide interconnection structure between an EO polymer waveguide and a passive polymer waveguide, the passive polymer waveguide including a fluorinated acrylate.

14. A waveguide structure, comprising:

an electrooptic (EO) polymer waveguide;

a passive polymer waveguide including a fluorinated acrylate; and a tapered EO polymer waveguide interconnection structure between the EO polymer waveguide and the passive polymer waveguide.

15. The waveguide structure of claim 14, wherein the EO polymer waveguide and the passive polymer waveguide provide single mode propagation, and the interconnection structure provides a coupling between the two waveguides without higher order mode coupling.

16. The waveguide structure of claim 14, wherein an interconnection loss associated with the interconnection structure is less than 0.4 dB.

17. The waveguide structure of claim 14, wherein the interconnection structure is vertically tapered.

18. The waveguide structure of claim 14, wherein a taper length of the interconnection structure is 300 μm or more.

19. The waveguide structure of claim 14, wherein a taper angle of the interconnection structure is no greater than 0.4 degrees.

20. The waveguide structure of claim 14, wherein the EO polymer waveguide and the passive polymer waveguide are formed as rib structure.

21. The waveguide structure of claim 14, wherein the EO polymer waveguide has a higher refractive index that the passive polymer waveguide.

22. The waveguide structure of claim 14, wherein the passive polymer waveguide has a larger mode profile than the EO polymer waveguide.

23. The waveguide structure of claim 14, wherein the EO polymer waveguide comprises a nonlinear chromophore.

24. The waveguide structure of claim 23, wherein the nonlinear chromophore includes a tricyanobutadiene acceptor and a phenyltretraene bridge.

* * * * *